United States Patent [19]

Aslakson

[11] 4,253,901
[45] Mar. 3, 1981

[54] METHOD OF HEAT SEALING EMPLOYING A HOT TACK ADHESIVE

[75] Inventor: R. Corbin Aslakson, Lake Jackson, Tex.

[73] Assignee: The Dow Chemical Company, Midland, Mich.

[21] Appl. No.: 812,090

[22] Filed: Jul. 1, 1977

[51] Int. Cl.$^3$ ............................................. C09J 5/06
[52] U.S. Cl. ............................... 156/327; 73/150 A; 156/64; 156/334; 428/515; 526/317
[58] Field of Search .................. 156/64, 327, 306, 334, 156/309, 344; 427/207 A; 428/500, 515; 526/317; 73/150 R, 150 A; 229/3.5 R; 93/DIG. 1; 53/33, 39

[56] References Cited

U.S. PATENT DOCUMENTS

| | | | |
|---|---|---|---|
| 2,614,953 | 10/1952 | Anglada | 156/306 |
| 2,844,956 | 7/1958 | Smith | 73/150 R |
| 3,239,370 | 3/1966 | Thomson et al. | 428/483 |
| 3,296,856 | 1/1967 | Elias | 156/64 |
| 3,412,606 | 11/1968 | Cooper et al. | 73/150 |
| 3,424,631 | 1/1969 | Peacock | 156/51 |
| 3,520,861 | 7/1970 | Thomson et al. | 428/500 |
| 3,520,861 | 7/1970 | Thomson et al. | 428/500 |
| 3,600,468 | 8/1971 | Böhme | 156/327 |

FOREIGN PATENT DOCUMENTS 655298 1/1963 Canada .
963380 7/1964 United Kingdom ................... 526/317

OTHER PUBLICATIONS

Anon. "Flexible Packages"–Modern Packaging Encyclopedia vol. 41, No. 7A, pp. 1, 209–211, 213–217, 543–545 and 550, 7-1968.

*Primary Examiner*—John J. Gallagher
*Attorney, Agent, or Firm*—L. J. Dankert; T. R. Wills

[57] ABSTRACT

Normally solid heat-activatable thermoplastic adhesives having improved hot tack strength at heat-seal temperatures are composed essentially of copolymers of ethylene with acrylic acid or methacrylic acid having standard melt flow values from about 1 to about 3 dg/min., and are especially useful as heat-seal coating or layer on substrates for packaging.

4 Claims, No Drawings

METHOD OF HEAT SEALING EMPLOYING A HOT TACK ADHESIVE

BACKGROUND OF THE INVENTION

This invention relates to thermoplastic adhesives that are activated by heat, especially as heat-seal layers or coatings on substrates for use in packaging. Various heat-activatable thermoplastic adhesives are known. Typically, the heat-seal adhesive layer or coating is locally positioned in contact with itself or with another receptive surface, locally heated under pressure to activate the adhesive material and cooled to effect bonding, e.g. to form a seam or seal.

In some instances, the heat-sealed structure is immediately or soon thereafter subjected to stresses tending to separate the structure while the adhesive is still hot and before it has developed its full ultimate strength at ordinary temperature. For example, in various form-fill-seal continuous packaging operations, a flexible strip of packaging film having a heat-seal coating or layer of adhesive material is continuously formed into a pouch with heat-sealed seams, the pouch is immediately filled with solid or liquid content and closed with another heat-seal, and the sequence is repeated at high rates. The pressure of the pouch contents and other stresses of the form-fill operation tend to open the freshly made hot seals. In other applications, a previously made heat-sealed structure may be re-heated as in a baking oven where the heat-activatable adhesive becomes softened by the heat and its strength is reduced.

It is known to use ethylene polymers such as polyethylene and copolymers of ethylene with various other monomers as heat-activatable adhesives, heat-seal layers and coatings, and the like. However, like many other heat-activatable adhesive materials, such ethylene polymers generally have less hot tack strength than is desired for some applications such as form-fill-seal packaging. Improved hot tack strength is still a desideratum of the art.

It would be desirable to have a heat-activatable thermoplastic adhesive material with improved strength at heat-seal temperature, i.e. such adhesive with improved hot-tack strength. Accordingly, it is an object of this invention to provide such adhesive with improved hot-tack strength. Another object is to provide improved means for effecting heat-seal bonding and structures having better hot bond strength. Other objects and advantages of the invention will become evident from the descriptions that follow.

SUMMARY OF THE INVENTION

In accordance with this invention, improved normally solid heat-activatable thermoplastic adhesives having greater hot tack strength, improved structures having such adhesives as heat-seal layer or coating, and improved structures bonded together by means of such adhesives and having greater bond strength at heat-seal temperatures are provided by means of adhesive materials composed essentially of copolymers of ethylene with acrylic acid and/or methacrylic acid having standard melt flow values in the range from about 1 to about 3 decigrams per minute (dg/min.). The copolymers have from about 6 to about 10 percent of acid copolymerized therein and based on the weight of the copolymer. Heat-seal structures useful for packaging, for example, have a suitable substrate and a heat-seal layer or coating thereon composed essentially of such copolymer. Bonded structures have adjacent parts bonded to an intermediate layer composed essentially of such copolymer. Heat-sealed and bonded structures are made by positioning the copolymer adhesive between the surfaces to be sealed or bonded and locally applying heat and pressure to activate the adhesive copolymer. The strength of the resulting seal or bond, while the adhesive copolymer is hot, is surprisingly great in contrast to that obtained from homopolyethylene, for example. The method of forming a seal or bond between facing substrate surfaces having a heat-activatable thermoplastic adhesive therebetween by conventional heat-seal procedures is improved by using the presently specified copolymers as the heat-activatable thermoplastic adhesive material.

DETAILED DESCRIPTION AND EMBODIMENTS

Copolymers of ethylene and acrylic and/or methacrylic acid are known per se, as are methods for their preparation. The particular copolymers for use in this invention have from about 6 to about 10, preferably from about 7 to about 9, weight percent of acrylic and/or methacrylic acid copolymerized therein based on the copolymer. The balance of the copolymer is preponderantly ethylene, although the copolymer can also include a small proportion, e.g. up to about the amount of acid monomer therein, of one or more other monomers copolymerizable with ethylene. Suitable such other monomers include olefins such as propylene and butene-1, ethylenically unsaturated esters of carboxylic acids such as ethyl acrylate and vinyl acetate, and the like.

It is necessary that the copolymers for use in this invention have melt flow values in the range from about 1 to about 3, preferably from about 1.5 to about 2.5, dg/min. as determined by standard ASTM Method Designation D-1238-70, Procedure A, under Condition E, i.e. at 190° C. under 2160 g total load. When used as heat-activated adhesives, copolymers within the defined limits are found to have high hot tack strength when compared to polyethylene and to copolymers outside such limits.

The specified copolymers are advantageously used in ways otherwise conventional for heat-activatable thermoplastic adhesives. For example, a thin surface layer or coating of the specified copolymer in the nature of a heat-seal layer or coating is provided on a substrate by any appropriate means such as by melt extrusion, curtain or roller coating or by film lamination or from fluid solution or dispersion. The substrate can be any solid surface to which the copolymer will satisfactorily adhere, e.g. paper, glass, plastic such as polyethylene, polypropylene and nylon, metal foil such as aluminum foil, and the like. The adhesive layer or coating can be co-extensive with the substrate or limited to the local area to which bonding is to be limited. When the substrate is plastic formed by extrusion, the copolymer layer can be provided by coextrusion thereof together with the plastic substrate.

Substrates having an adherent heat-seal layer or coating of the specified copolymers are advantageously sealed or bonded together, e.g. the copolymer material being sealed or bonded to itself, or to another receptive adherent substrate, in manner otherwise conventional. Alternatively, the specified copolymer material can be separately provided and placed between the substrate surfaces to be sealed or bonded together just prior to the heat-sealing or -bonding operation. Usually, the members to be sealed or bonded together are brought together with the heat-seal adhesive material between the members under sufficient pressure to insure intimate contact in the area to be sealed or bonded, and heat is applied locally in that area sufficient to activate the adhesive material for time sufficient to obtain bonding of the adhesive material to itself or to adjacent substrate surfaces as the case may be. Heated bars, rods, wires, shoes, irons, rollers and like devices are commonly used. Local temperatures at the heat-seal area in the range from about 110° to about 200° C. are used to effect sealing and bonding with the present copolymer adhesives.

As indicated hereinbefore, in some operations such as form-fill-seal pouch packaging at high rates and short cycle times, a heat-sealed seam or bond between substrates is promptly subjected to forces tending to separate or pull the seam or bond apart while the adhesive is still hot. In such instances, the ultimate bond or seal strength that would be obtained after the adhesive had cooled to ambient temperature is not the sole criterion for acceptability; regardless of its ultimate adhesive strength or other attributes, an adhesive is not acceptable in such applications if it lacks hot tack strength. It is in this regard that the specific copolymers of this invention are unexpectedly advantageous because of their high hot tack strength at temperatures in the heat-seal temperature range from about 110° to about 200° C.

One experimental means of evaluating the hot tack strength values of heat-activatable thermoplastic adhesive materials is described in U.S. Pat. No. 3,412,606 (1968) to B. A. cooper and W. H. Wharton.

Using such apparatus and technology, ethylene polymers were tested as heat-seal adhesives on paper substrates. Five polymers, identified and characterized below were tested:

| Adhesive Polymers | | | |
|---|---|---|---|
| Polymer No. | Polymer Kind | Acrylic Acid[2] | Melt Flow dg/min. |
| 1.[1] | Homo- | nil | 5.5 |
| 2. | Co- | 3.5% | 11. |
| 3. | Co- | 3.5% | 2. |
| 4. | Co- | 8% | 9. |
| 5. | Co- | 8% | 2. |

[1] Homopolyethylene having density 0.916 g/cc.
[2] Copolymerized with ethylene, as percent by weight of copolymer.

These polymers were separately applied by conventional melt extrusion coating procedure to one side of 40 lb/ream unbleached kraft paper in coating thickness of one mil. In each test, two strips each two inches wide of the same kind of coated paper stock were placed in parallel with coated sides facing and in contact with each other on the gradient temperature bar of the testing apparatus and were pressed together after the coatings had reached the bar temperature. In the particular test apparatus used, the highest recorded temperature at the hot end of the gradient bar was about 160° C.; the lowest recorded temperature was about 100° C. at the lower end of the gradient range, near the cold end of the bar. The bottom-most of the pair of strips was clamped to the bar at its ends, while the upper-most strip was brought back from the hot end at angle of 180° to the bottom-most strip on the bar surface and was peeled away from the bottom strip at rate of 5 inches per minute from the hot end toward the cold end of the heat-seal gradient temperature bar. The force required to separate the two strips is expressed in pounds taken with the position on the bar and thus the temperature of the adhesive bond where the separation was occurring at that instant; the resulting data are shown in the Table below. As will be seen from the results with polyethylene as the heat-seal adhesive, the normal behavior is that the separation force is low at the highest temperature, it rises (strength increases) as the temperature decreases and the adhesive becomes more viscous in the seal, reaches a peak near the adhesive melting point, then drops off rapidly at still lower temperatures where the temperature is too low to activate the adhesive. Where the seal strength (force to separate the strips) exceeded about 10 pounds, the paper strips tore, i.e. the adhesive and cohesive strength of the copolymer was stronger than the strength of the paper substrate, and numerical values above 10 pounds could not be measured; also, force values at lower temperatures could not be measured after the paper strip tore in that test.

| | HOT TACK STRENGTH Pounds of Force | | | | |
|---|---|---|---|---|---|
| Temperature °C.[1] | Polymer No. | | | | |
| | 1 | 2 | 3 | 4 | 5 |
| 158° | 5. | 5. | 6.9 | 5.5 | >10 |
| 155° | 5.1 | 5.1 | 7. | 5.6 | ND |
| 146° | 5.2 | 5.3 | 7.4 | 5.9 | |
| 136° | 5.6 | 6. | 9.2 | 6.7 | |
| 126° | 6.1 | 7. | >10 | 7.7 | |
| 118° | 6.1 | 8. | ND | 8.8 | |
| 111° | 4.5 | ~10. | | >10 | |
| 105° | 1.3 | >10 | | ND | |

[1] ± about 1° C.
ND Not determined because paper substrated tore at higher temperature and test was terminated.

From the data shown in the Table of hot tack strength values, all of the copolymers tested were better than the standard ethylene homopolymer, particularly at lower temperatures; however, any improvement in copolymers numbers 2, 3 and 4 over homopolyethylene was marginal at higher temperature, e.g. above about 150° C. In contrast, copolymer number 5, with 8 weight percent acrylic acid and melt flow value 2 dg/min., afforded a complete seal, stronger than the paper substrate, even at the highest measured temperature of 158° C. Copolymer number 5, with 8 wt. % acrylic acid copolymerized therein with ethylene and having melt flow value of 2 dg/min. is especially well suited for use as the heat-seal coating layer on structured film material in form-fill-seal packaging operations.

In other tests, it was found that copolymers of ethylene and acrylic acid with from about 6 to about 10 weight percent acrylic acid based on the copolymer, having melt flow values from about 1 to about 3 dg/min., gave results comparable to those of copolymer number 5 in the foregoing tests.

What is claimed is:
1. In a method of forming a seal or bond between facing substrate surfaces having a heat-activatable thermoplastic adhesive material therebetween by applying pressure sufficient to maintain intimate contact between the adhesive material and the substrate surfaces and heating to a temperature in the heat-seal range to activate the thermoplastic adhesive material in the area to be sealed or bonded, wherein the resulting seal or bond is subjected to force tending to separate the substrate surfaces while the adhesive material therebetween is at a temperature in the heat-seal range, the improvement wherein the heat-activatable thermoplastic adhesive material is composed essentially of a copolymer of ethylene and at least one acid selected from acrylic acid and methacrylic acid, which copolymer contains from about 6 to about 10 weight percent of said acid based on the copolymer and has melt flow value in the range from about 1 to about 3 dg/min., whereby the resulting seal or bond has high hot tack strength.

2. The improvement according to claim 1 wherein the heat-activatable thermoplastic adhesive material is composed essentially of a copolymer of ethylene and from about 7 to about 9 weight percent acrylic acid based on the copolymer, and the copolymer has melt flow value in the range from about 1.5 to about 2.5 dg/min.

3. The improvement according to claim 1 wherein the heat-activatable thermoplastic copolymer adhesive material is an adherent heat-seal layer or coating on at least one of the facing substrate surfaces.

4. The improvement according to claim 1 wherein the heat-activatable thermoplastic copolymer adhesive material is an adherent heat-seal layer or coating on each of two facing substrate surfaces and the seal or bond is formed by heat-seal-bonding the copolymer adhesive material to itself.

* * * * *